Nov. 6, 1962  W. SCHIFFERS ET AL  3,061,905
WASHING AND FULLING OR MILLING MACHINE
Filed March 7, 1958  3 Sheets-Sheet 3
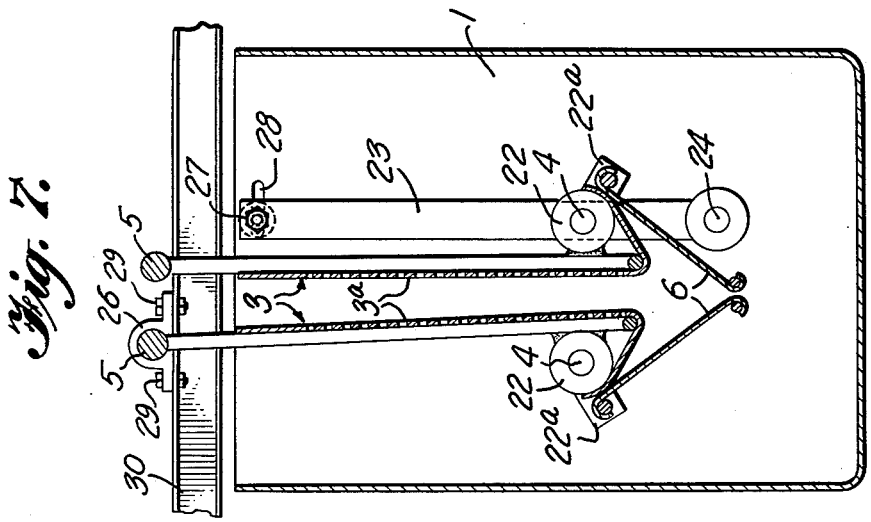
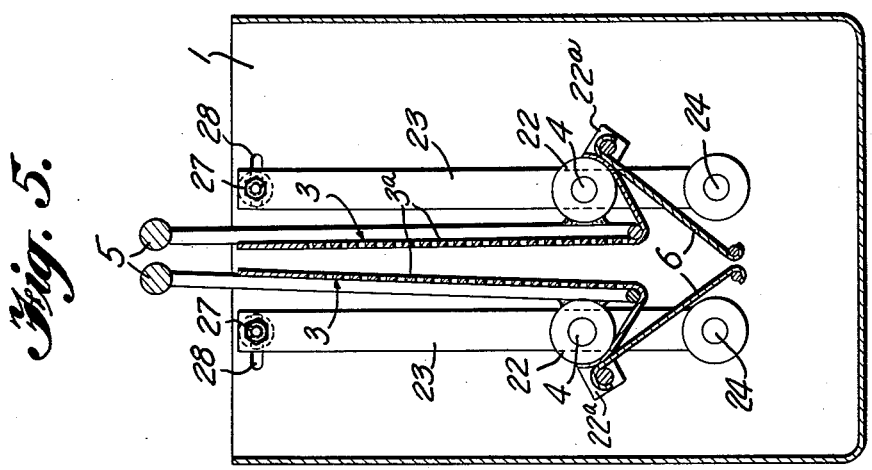
INVENTORS
WILHELM SCHIFFERS
PAUL SCHIFFERS
BY Mason, Fenwick & Lawrence
ATTORNEYS 3,061,905
WASHING AND FULLING OR MILLING
MACHINE
Wilhelm Schiffers, Kardinalstrasse 13, and Paul Schiffers, Preussweg 57, both of Aachen, Germany
Filed Mar. 7, 1958, Ser. No. 719,908
7 Claims. (Cl. 26—19)

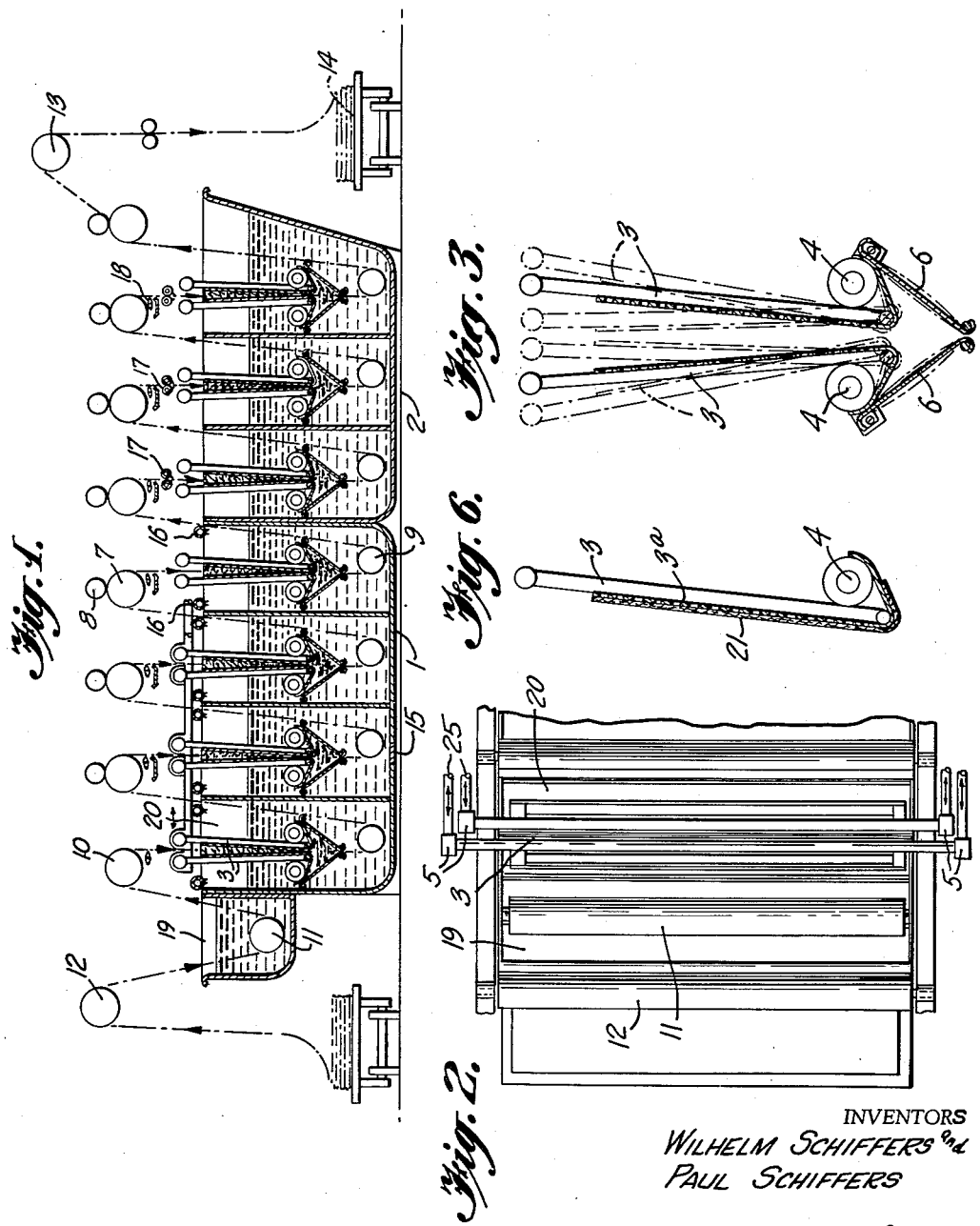

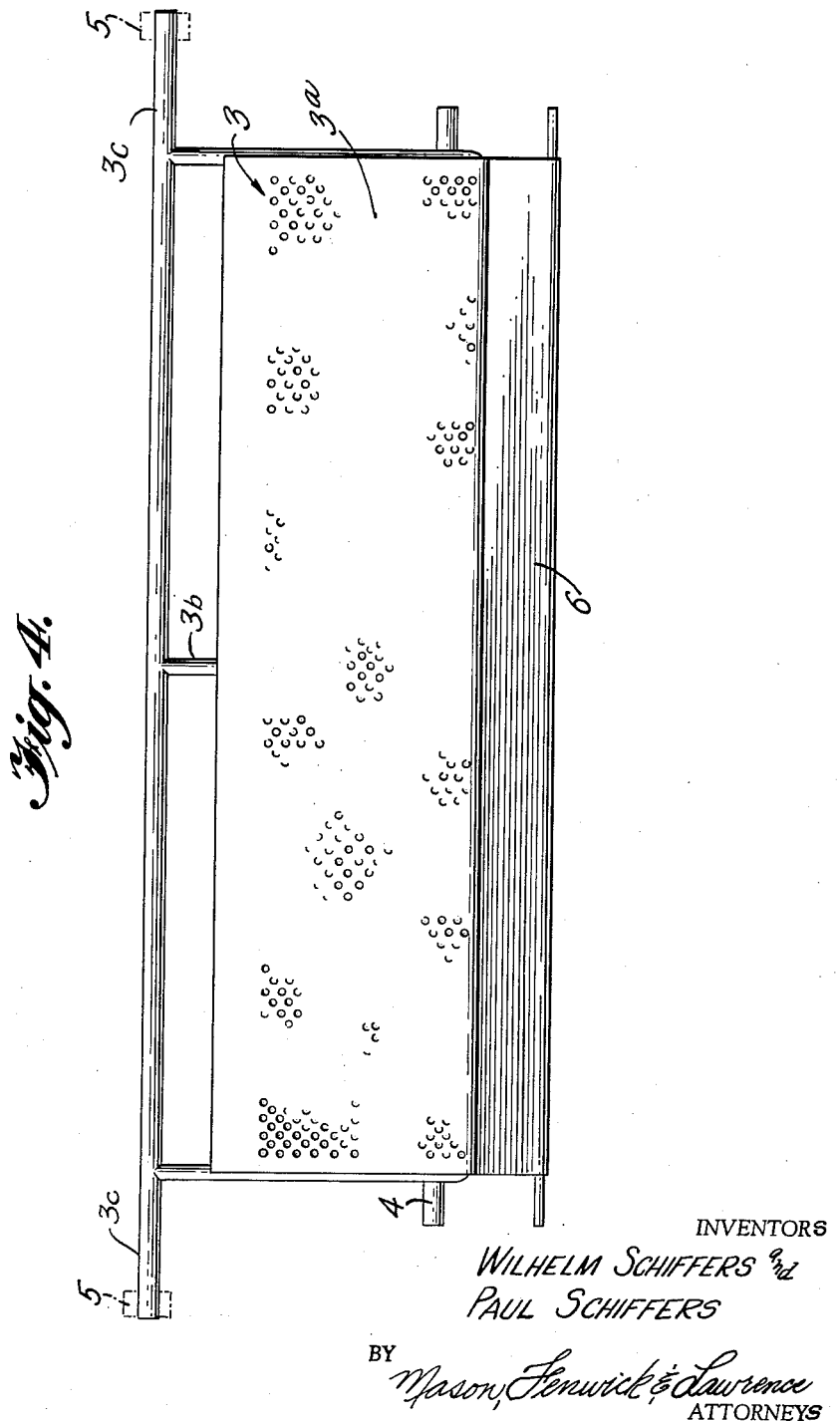

This invention relates to washing and fulling or milling machines, the object being to provide an improved machine of the continuous type, especially for woolen fabrics.

According to this invention, a washing and fulling or milling machine comprises at least one assembly of a pair of kneading blades of which at least one blade is mounted on a horizontal axis so as to rock or move angularly relative to the other blade, the said two blades being mounted so as to define in their outer positions relative to each other a downwardly tapering gap through which the material is passed.

Each rockable kneading blade may be provided with a pivot pin disposed between the upper and lower ends of the blade, and preferably nearer to the lower end whereby when the upper portions of the kneading blades move towards one another their lower portions move away from one another, and vice versa, so that the gap between the kneading blades, through which the fabric is passed, assumes a conical form which is alternately reversed.

Adjustable plates for receiving the fabric from the said gap between the kneading blades may be disposed at an angle to one another at the lower ends of the kneading blades, so as to leave an adjustable channel for the passage of the fabric, the said plates being secured to the kneading blades so as to participate in the oscillating or angular movement of the kneading blades.

The continuously fed fabric is forced into transverse folds between the kneading blades and is subjected to an effective kneading, squeezing, shoving and fulling action by the rocking kneading blades. The fabric remains between the kneading blades for a sufficient time for the treatment despite the fact that it is continuously moved through the lower delivery gap between the said blades.

For adjusting the machine to the nature of the material, the pivot pins of the kneading blades may be adjustable vertically and/or horizontally, for adjustment of the distance between the kneading blades, of the downwardly tapering form of the gap between the said blades, and of the width of the delivery gap between the kneading blades.

The kneading blades may comprise perforated plates. The perforation of the blades serves to allow the passage (discharge and entry) of the washing liquid, whereby the said liquid is forced through the fabric and sucked back in order to intensify the washing action. The enrichment of the solution with oxygen which is thereby effected also assists in achieving this effect.

In addition to, or instead of the perforated plates, the kneading blades may be covered with resilient material, such as felt, foamed rubber or the like.

A machine according to the invention has a high output.

Referring to the accompanying drawings:

FIG. 1 is a vertical longitudinal section of a machine embodying one form of the invention;

FIG. 2 is a plan view of part of the machine shown in FIG. 1;

FIG. 3 is a sectional elevation of an assembly of kneading blades embodied in the machine shown in FIG. 1;

FIG. 4 is a side elevation of a single kneading blade;

FIG. 5 shows means for adjusting the pivots of the kneading blades;

FIG. 6 is a sectional elevation of a modified kneading blade; and

FIGURE 7 is a sectional elevation showing a further modification of the invention.

The continuous type washing and fulling or milling machine illustrated in full width in FIG. 1 is divided into main troughs 1 and 2. Each of the said main troughs is sub-divided into any desired number of sub-troughs each of which accommodates a kneading blade assembly. The fabric material which is to be washed and fulled or milled is treated with soap solution in the main trough 1, while a rinsing process takes place in the main trough 2. In the sub-troughs, like pairs of kneading blades 3 extending over the entire width of the fabric material are so mounted on horizontal pivot pins 4 as to rock relative to one another. The oscillating rocking movement of the kneading blades 3 of an assembly thereof towards and away from one another is effected through rods 25 which are jointed at 5 to the pins 3c of the blades. Each kneading blade 3 comprises a perforated pressure plate 3a extending over the entire length of the blade and is secured to a tubular frame 3b. The two kneading blades of an assembly thereof are arranged with respect to one another so that in the outer position of their oscillating movement a downwardly tapering gap is defined between them.

The web of fabric introduced into the gap between the kneading blades is caused to fold transversely and is intensively kneaded by the said blades in rapid succession, and in addition oxygen is forced or beaten through the washing solution by the rocking movement, so that the solution exerts the maximum washing action.

The location of pivot pins 4 is not critical and may be disposed at any desired position between the top and bottom edges of the kneading blades 3, so that when the upper portions of the two blades move towards each other the lower portions move away from each other and vice versa, whereby the gap between the blades assumes a conical form which is alternately reversed. Such position of the pivot pin 4 may be adjustable, depending upon whether a greater or smaller pressure is to be exerted on the material being treated. The position of the pivot pins 4 on the machine may also be adjustable laterally of the blades so that the gap between the two kneading blades of an assembly may be adapted to the quality of the material which is to be treated.

For this purpose the pivot pins 4 of the kneading blades, which are engaged by eyes 22 on the kneading blades 3, are according to FIGURE 5, fixedly secured at a desired position along levers 23 which are pivotally mounted on the machine frame by means of pivots 24. This position is determined prior to manufacture or assembly of the machine. The destance between the pivot pins 4, and therefore between the kneading blades 3, is regulated by pivotally adjusting the said levers 23. This may be accomplished by pivoting the levers 23 about the pivot points 24 located at their lower ends. The upper ends as seen from FIGURE 5, are slidable in slots 28 by means of screws 27. Vertical displacement of the pivot pins 4 is preferably effected by securing the eyes 22 to the levers 23 at a desired position between the top and bottom edges of the kneading blades 3.

Disposed below the kneading blades 3 are collecting plates 6 which are also disposed at an angle in relation to one another and which participate in the movement of the kneading blades and take up the web of fabric when it leaves the kneading blades. The plates 6 are fixedly mounted on the blades 3 by securing the upper end of the plates 6 to ears 22a which are fixed to eyes 22 so that the width of the channel defined between the plates 6 for the passage of the web of fabric may be adjusted upon adjustment of the blades.

The web of fabric is guided from the collecting devices 6 around return rollers 9 to pairs of squeezing rollers 7 and 8. The lower squeezing rollers 7 are positively driven and pull the web of fabric from the collecting devices 6, around the return rollers 9, and out of the sub-troughs. Disposed above each sub-trough 20 of the main soap solution trough 1 are two pipes 16 through which the washing solution from a storage container is introduced into the said sub-trough. Each sub-trough 20 is about two-thirds filled with washing solution. Washing solution can be withdrawn from said sub-troughs at 15. It will be understood that while only one withdrawing means 15 is shown in FIG. 1, each sub-trough will be provided with such means.

After leaving each pair of kneading blades 3, the web of fabric is completely squeezed out by the squeezing rollers 7 and 8, and the dirty washing solution is discharged through a known device as required. In addition, there are situated below the squeezing rollers 7 devices 18 which remove from the said squeezing rollers any fabric web which may adhere thereto. Situated above each sub-trough of the main trough 2 are water spray pipes 17 which spray the web of fabric with water before it enters the assembly of kneading blades 3. The passage of the web of fabric through the sub-troughs of the rinsing main trough 2 is in principle the same as that through the sub-troughs 20 of the soaping main trough 1, the web here again being passed through a pair of squeezing rollers after leaving each assembly of kneading elements, being squeezed out, again sprayed with water by spray pipes 17, and so on.

Before entering the machine by way of a roller 12, the web of fabric passes into an initial trough 19 around a return roller 11, whence it is passed over a feed roller 10 into the soaping main trough 1. The web of fabric is wetted in the trough 19. Situated at the outlet end of the machine are a take-up roller 13 and a delivery device 14 by which the web of fabric is delivered from the machine.

When it has travelled from the inlet to the delivery end, the web of fabric has undergone the entire washing and fulling or milling and rinsing cycle. The number of pairs of kneading blades 3 disposed in the main troughs 1 and 2 is so chosen that the material is thoroughly washed and fulled or milled and rinsed in one passage through the machine.

The machine is provided with known means for regulating the speed of travel of the material.

Instead of both kneading blades 3 of an assembly thereof being mounted for angular movement, one blade only of each pair may be angularly movable, the other blade being fixedly mounted as shown in FIG. 7, wherein only blade 3 at the right is pivotally and adjustably mounted, the blade at the left being fixed and immovable. For this purpose, the joint 5 of the left hand blade is set in a bearing 26 fastened by screws 29 to a beam 30 of the machine frame.

In addition to the perforated plates 3a, the kneading blades may be provided with coverings 21 consisting of suitable resilient materials such as felt, foamed rubber or the like, as shown in FIG. 6. In some cases the resilient material coverings 21 may be substituted for the perforated plates 3a.

What we claim and desire to secure by Letters Patent is:

1. A machine for washing and fulling a continuous strip of cloth comprising, a trough for holding a washing liquid, first and second spaced apart kneading blades pivotally mounted in paired confronting relation therein defining a conical path for the cloth between said blades, said kneading blades having upper and lower ends, said pivotal mounting of said blades being spaced intermediate said upper and lower ends, means for delivering cloth between the upper ends of said blades, means for angularly moving said blades about their pivotal mountings to produce alternately an upright conically shaped path and an inverted conically shaped path for said cloth, said angular movement being in simultaneously opposite strokes for each blade so that their upper ends move away from each other to receive cloth between said blades and move toward each other to squeeze the cloth, and so that their lower ends move toward each other to press the cloth and stop its movement from between the blades and move away from each other to release the cloth, respectively.

2. In a machine as claimed in claim 1, first and second collector plates having upper and lower ends respectively, said upper ends of said collector plates being mounted adjacent the lower ends of said kneading blades respectively, and outwardly offset therefrom, said collector plates forming a narrowing tapered passageway between their said upper and lower ends, said first and second collector plates moving in unison with the angular movement of said first and second kneading blades, respectively.

3. In a machine as claimed in claim 1, said confronting portions of said kneading blades being perforated.

4. In a machine as claimed in claim 1, said confronting portions of said kneading blades having a resilient liquid-pervious covering.

5. A machine for washing and fulling a continuous strip of cloth comprising, a trough for holding a washing liquid, first and second kneading blades defining a through path for the strip of cloth, each of said blades having upper and lower ends and pivotally mounted intermediate said ends, said blades being in paired confronting relationship within said trough, means cooperating with said blades to alternately move confronting ends of said blades relatively toward and away from each other thereby defining alternately an upright conically shaped path and an inverted conically shaped path for said strip whereby the cloth is kneaded and fulled.

6. A machine for washing and fulling a continuous strip of cloth comprising, a trough for holding a washing liquid, first and second kneading blades defining a through path for the strip of cloth, each of said blades having upper and lower ends and pivotally mounted intermediate said ends, said blades being in paired confronting relationship within said trough, means operatively associated with said blades to produce angular movement thereof which alternately opens and closes said ends of said blades whereby to aid in controlling the passage of the strip of cloth therethrough to assure the proper fulling action on the cloth strip, said means for alternately angularly opening and closing said ends comprises laterally moving rods connected to the upper ends of said blades, the movement of said rods being such that the blades pivot to define an alternately upright conically shaped through path and an inverted conically shaped through path for said strip whereby the cloth is kneaded and fulled.

7. A machine for washing and fulling a continuous strip of cloth comprising, a trough for holding a washing liquid, first and second kneading blades defining a through path for the strip of cloth, each of said blades having upper and lower ends and pivotally mounted intermediate said ends, said blades being in paired confronting relationship within said trough, means operatively associated with said blades to produce angular movement thereof which alternately opens and closes said ends of said blades whereby to aid in controlling the passage of the strip of cloth therethrough to assure the proper fulling action on the cloth strip, collector plates secured to the lower ends of said blades for movement therewith, said plates defining a conically shaped path for said cloth which opens and closes to further control the passage of the cloth therethrough.

References Cited in the file of this patent

UNITED STATES PATENTS

| | | |
|---|---|---|
| 536,279 | Gessner | Mar. 26, 1895 |
| 1,273,852 | Harris | July 30, 1918 |
| 2,039,882 | Cannity | May 5, 1936 |
| 2,095,216 | Hunter et al. | Oct. 5, 1937 |
| 2,442,742 | Morrill | June 1, 1948 |

FOREIGN PATENTS

| | | |
|---|---|---|
| 1,097,322 | France | Feb. 16, 1955 |
| 912,447 | Germany | May 31, 1954 |